(12) United States Patent
Shaw, Jr.

(10) Patent No.: US 10,513,209 B2
(45) Date of Patent: Dec. 24, 2019

(54) PADDING AND/OR EXPANDABLE ARMREST INTEGRATED INTO UPPER DOOR OF VEHICLE

(71) Applicant: Vincent Gabriel Shaw, Jr., Davidsonville, MD (US)

(72) Inventor: Vincent Gabriel Shaw, Jr., Davidsonville, MD (US)

( * ) Notice: Subject to any disclaimer, the term of this patent is extended or adjusted under 35 U.S.C. 154(b) by 251 days.

(21) Appl. No.: 15/481,374

(22) Filed: Apr. 6, 2017

(65) Prior Publication Data

US 2018/0290572 A1   Oct. 11, 2018

(51) Int. Cl.
*B60N 2/75* (2018.01)

(52) U.S. Cl.
CPC .............. *B60N 2/783* (2018.02); *B60N 2/753* (2018.02)

(58) Field of Classification Search
CPC .......... B60N 2/753; B60N 2/783; B60N 2/72; B60N 2/763; B60N 2/767; B60N 2/77; B60N 2/773; B60N 2/78; B60N 2/787
USPC ................... 296/153, 146.7, 146.9, 152, 207
See application file for complete search history.

(56) References Cited

U.S. PATENT DOCUMENTS

| | | | | |
|---|---|---|---|---|
| 2,633,380 A * | 3/1953 | Shapiro | ................. | B60N 2/783 296/153 |
| 4,982,921 A * | 1/1991 | Sanders | ................. | B60N 2/783 248/118 |
| 5,964,497 A * | 10/1999 | Wiles | ..................... | B60N 2/783 296/153 |
| 6,981,735 B1 * | 1/2006 | Stephens | ................ | B60N 2/753 296/153 |
| 7,484,809 B2 * | 2/2009 | Hughes | .................... | B60N 2/77 297/411.22 |
| 9,827,889 B1 * | 11/2017 | Cline | ....................... | B60N 2/78 |
| 2014/0217798 A1 * | 8/2014 | Negusse | ................ | A47C 7/543 297/411.3 |

FOREIGN PATENT DOCUMENTS

FR   2892071 A1 *   4/2007   ............. B60N 2/783

* cited by examiner

*Primary Examiner* — Joshua E Rodden

(57) ABSTRACT

A vehicle door padding feature and optional expansion feature that creates an armrest integrated as part of a vehicle door sill at the upper part of the door near the junction of the door covering and the window, and/or an expandable armrest in the door sill/upper door area via extension toward the inside of the vehicle.

8 Claims, 2 Drawing Sheets

PADDING AND/OR EXPANDABLE ARMREST INTEGRATED INTO UPPER DOOR OF VEHICLE

CROSS REFERENCE TO RELATED APPLICATIONS

N/A

STATEMENT REGARDING FEDERALLY SPONSORED RESEARCH OR DEVELOPMENT

N/A

REFERENCE TO SEQUENCE LISTING, A TABLE, OR A COMPUTER PROGRAM LISTING COMPACT DISC APPENDIX

N/A

BACKGROUND OF THE INVENTION

Field of the Invention

The present invention relates to the design and manufacture of the interior of the door for an automobile or other vehicle with an enclosed cabin design (e.g. trucks). More specifically, the invention comprises padding (e.g. a form of padding such as a gel-like material) manufactured as some or all of the top of a door sill which can act as an armrest and support a driver's (or a passenger's) arm and elbow with an optional fold-out feature to extend the surface area of the armrest.

Description of Related Art

Numerous forms of armrest have been patented for use on or near a vehicle door sill. However, none of them use an integrated padded door sill as the primary platform for an armrest or create the ability to temporarily extend such an armrest area to create a larger and/or inwardly extended armrest surface. Existing vehicular armrests can generally be divided into those built into the interior side of a door in the middle third of the door;

detachable non-integrated padded armrests which may create an armrest at or near the door sill area, or somewhere lower on the door;

armrests in the center of the vehicle for the arm of the driver or passenger which is not against the door; and Armrests integrated into the seat of an occupant.

For the purpose of describing the patentability of the present invention, those armrests which are implemented in the center of the vehicle for the inner arm of the driver or passenger, or those integrated into the seat bear no resemblance to the present invention and will not be discussed further herein.

Of the two remaining categories, those that bear the greatest similarity in function to the present invention are those that are detachable or otherwise not integrated into the door panel and which create an armrest function at or near the level of the door sill. U.S. Pat. No. 7,661,762 represents a good example of this type of armrest, but it/they are significantly different from the present invention. They are not affixed or integrated into the construction of the door or affixed in a sturdy permanent manner to the door. They are subject to slippage in position during use and can be dislodged by the movement of the window if in contact with the window, as show in U.S. Pat. No. 7,661,762. They are not visually well integrated and they are subject to loss or theft when the vehicle is under maintenance or otherwise unprotected. They have a fixed area not subject to expansion at the occupant's discretion. These key differences make the present invention a substantially unique advance over these types of prior art.

The other remaining category of relevant prior art includes armrests integrated or attached into the center third of the door placing them substantially below the door sill. This placement makes it impossible for most drivers to use the armrest while maintaining hand contact with the steering wheel in the upper portion of the wheel if so desired. Additionally, these armrests are predominantly of fixed size for the surface area of the armrest. None of them are integrated into the door sill area and/or combined with a fold-out expansion option as provided in the present invention.

BRIEF SUMMARY OF THE PRESENT INVENTION

The present invention comprises padding (e.g. a gel or gel-like material) integrated into the top of a vehicle door sill which can act as an armrest and support the occupant's arm and/or elbow without the relative discomfort caused by current designs which do not have a combination of padding and shape which would provide a comfortable support. This would apply for both left and right-hand drive vehicles, all types of road-going vehicles including cars, light trucks and heavy trucks. Additionally the invention optionally provides for a temporarily expandable armrest surface via rotation toward the inside of the vehicle. The expandable feature could provide an additional armrest option if the basic sill padding is used, or the expandable feature could be the sole form of armrest provided under the present invention.

REFERENCE NUMBER DESCRIPTIONS

1—Padded Layer within Door Sill
2—Door sill armrest location
3—Optional inward rotation
4—Surface of armrest in extended position
5—Lower boundary of the optional second padding layer

DETAILED DESCRIPTION OF THE INVENTION

Figure 1:
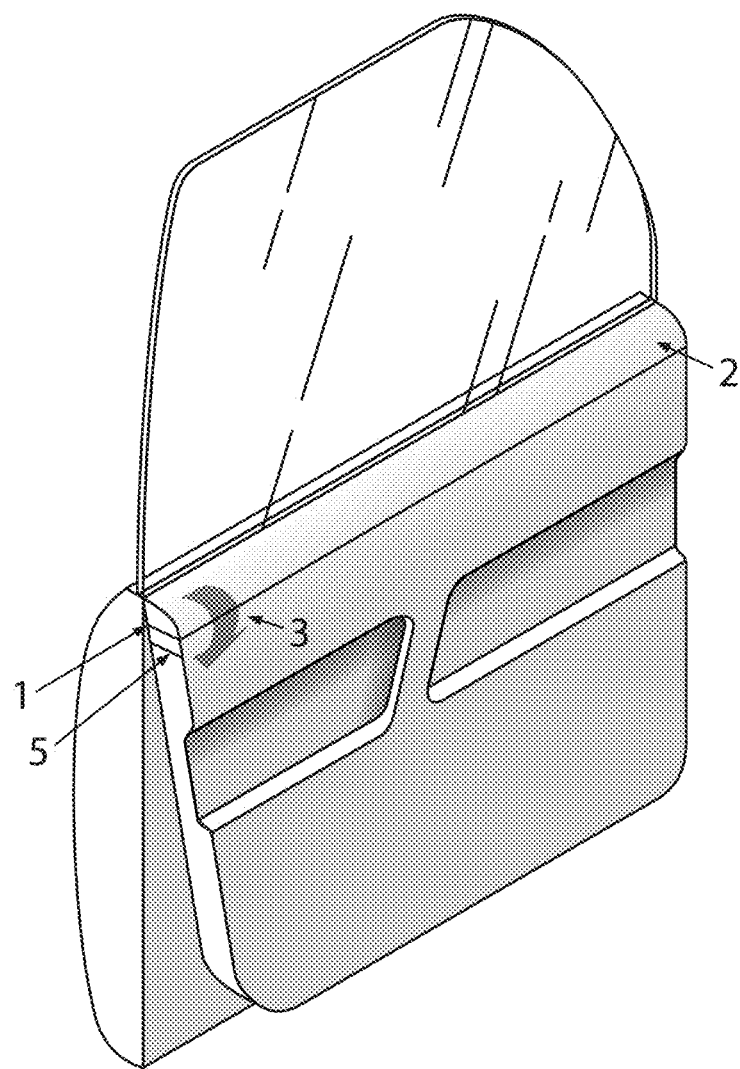
FIG. 1 shows the invention configured as padding in the upward facing portion of the vehicle door sill to create a padded surface suitable as an arm and/or elbow rest.
Figure 2:
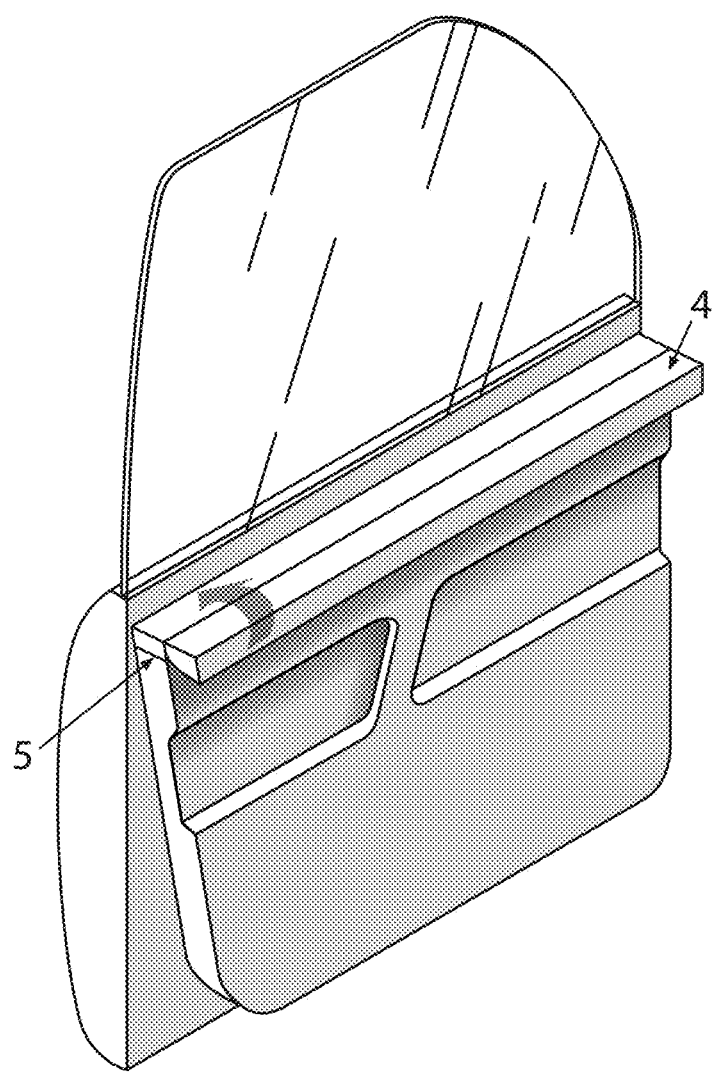
FIG. 2 shows the invention configured as an extendable surface which can optionally be padded in both the stored (FIG. 1) or extended position to create a larger and/or inwardly positioned armrest feature.

FIG. 1 shows the armrest of the present invention integrated into the door as a layer of padding and with the optional extension feature shown in the extended position in FIG. 2 in the stored/retracted position in FIG. 1. The key feature of this embodiment of the invention is the layer of padding shown above the point marked as line number (1). The thickness of this layer need not be precise but must provide a degree of padding greater than that customarily found in other surfaces within the interior vehicle features where a simple layer of upholstery or plastic is found without meaningful padding or cushioning affect. The embodiment shown in FIGS. 1 and 2 extends the entire length of the door sill (2) however the invention could cover any subset of the door sill surface area. In this embodiment the invention is a padded layer along any subset of the door sill area indicated by number 2. This area is a typical and natural resting place for a passenger's arm and/or elbow or the driver's arm and/or elbow when in the driving position, however in the absence of the present invention it is found as an unpadded hard surface equivalent to other areas of the door surface, or a surface with no greater padding than that found on other door areas not intended as an armrest and is thus poorly suited for arm/elbow support. Prior art that provides armrest capability at or near the level of the door sill (2) are universally detachable, aftermarket additions and are not integrated with the construction of the door itself, either through original manufacture or permanent/semi-permanent add-on attachment as provided in the present invention.

The layer of padding shown in FIG. 1 is integrated into the door sill at original manufacture, permanently affixed to the existing sill via adhesive, or semi-permanently attached via means such as loop and hook fasteners. It may exist in combination with the expandability feature shown in FIG. 2, however it is not required for the expandability feature (i.e. armrest capability may be provided only in the expanded position, only as a fixed, padded sill, or as both.)

The vertical area between lines 1 and 5 depicts a second optional layer of padding necessary to create a larger area of padded surface if the optional extension feature is implemented by hinging and rotating a portion of the padding inward toward the vehicle driver or passenger through an arc (3) around a hinge as further depicted in FIG. 2.

Note that the figures and this descriptive text could apply to either left or right-hand drive and could apply to either the driver or a passenger in part of the vehicle with a related window and sill structure.

The padded layers described above can be composed of any substance sufficient in function and depth to provide a degree of impact absorption and load distribution beyond that found on the minimally padded surfaces customarily found on vehicle interior coverings or other areas of the door in areas not suitable for supporting body parts (e.g. the dashboard surface or vertical door surfaces). Examples of substances that could provide this padding include but are not limited to various "foam" and "gel" materials, animal products such as down/feathers, and air capsules or chambers.

The current embodiment depicts a combination of a flat and horizontal surface with a sloping rounded feature, however various angles and shapes could be used provided that any portion of the surface provides arm and/or elbow support.

FIG. 2 shows the door sill surface extended to create a larger surface (4) for the armrest which can be expanded or retracted and, due to the nature of the padding, can (optionally) serve as an armrest in either the expanded position depicted in FIG. 2 (inwardly extended) or in the retracted position depicted in FIG. 1. The line in the center of the surface indicated by number 4 represents any form of hinge or pivot (e.g. rotation around fixed end points) or other apparatus (e.g. slide) which allows the armrest to shift between the stored/retracted position and the extended position. As in FIG. 1, while the current figures show the invention configured to create an armrest running the entire length of the door, the invention could be implemented as any subset of the length of the door. The extended portion of the armrest would be comprised of a firm but pliable padding such that it would not create a risk of injury in the event of a crash or other driving scenario.

The vertical area between lines 1 and 5 depicts an optional second layer of padding under the area covered in the retracted position such that a surface area greater than the extended portion can serve as a padded surface for arm and/or elbow support.

While the current embodiment shows the extensible, inward rotating surface as flush with the window in the stored (un-extended position), a flush fit to the window is not a mandatory feature of the invention and an extended surface could be created starting from an area in the door surface below the point of contact with the window.

Note that all of the features necessary to create the extended surface shown in FIG. 2, specifically the hinged/pivot surface (4), extension ability (3) and second layer of padding (5), are strictly optional and the invention can be implemented with the padded layer on a portion of the top of the door sill as the only feature. Alternately, the inwardly extending armrest can be implemented without the padded portion of the door sill in the retracted position shown in FIG. 1. This configuration would only create a padded feature in the extended position.

Either configuration shown in FIG. 1 or 2 could also optionally incorporate a form of embedded heat as an optional feature.

The invention does not preclude any other form of armrest on lower portions of the door such as those currently found below the upper third of the door where the present invention is focused.

I hereby claim:

1. A vehicle door in combination with an armrest comprising: the vehicle door comprising a door sill which forms an upper portion of the vehicle door where a vertical upholstery transitions to the armrest, wherein a top of the armrest in a retracted position terminates at a window of the door, the armrest being pivotally attached to a top of the vertical upholstery such that said armrest can pivot between the retracted position and an extended position, when in the retracted position the top of the armrest has an arcuate surface terminating at the window of the door while a bottom of the armrest has a horizontal surface which engages with a horizontal surface of the vertical upholstery, and when in the extended position the horizontal surface of the armrest aligns with the horizontal surface of the vertical upholstery.

2. The vehicle door in combination with the armrest of claim 1, wherein the armrest covers an entire length of the door sill.

3. The vehicle door in combination with the armrest of claim 1, wherein the armrest is integrated into the door permanently.

4. The vehicle door in combination with the armrest of claim 1, wherein the armrest is integrated into the door by an adhesive.

5. The vehicle door in combination with the armrest of claim 1, wherein the armrest is integrated into the door by hook and loop fasteners.

6. The vehicle door in combination with the armrest of claim 1, wherein the armrest is formed from a material including at least one of: foam, gel, down/feathers, air capsules or chambers.

7. The vehicle door in combination with the armrest of claim 1, wherein the horizontal surface of the vertical upholstery is formed by an additional layer of padding integrated into the vertical upholstery.

8. The vehicle door in combination with the armrest of claim 7, wherein the additional layer of padding is formed from a material including at least one of: foam, gel, down/feathers, air capsules or chambers.

* * * * *